Jan. 8, 1963     D. R. JAMES     3,072,161
CITRUS PEEL SLICER
Filed March 13, 1959     2 Sheets-Sheet 1
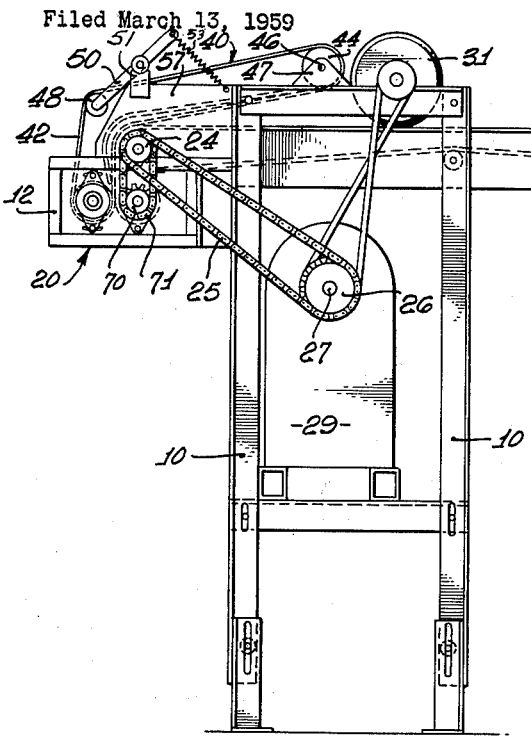
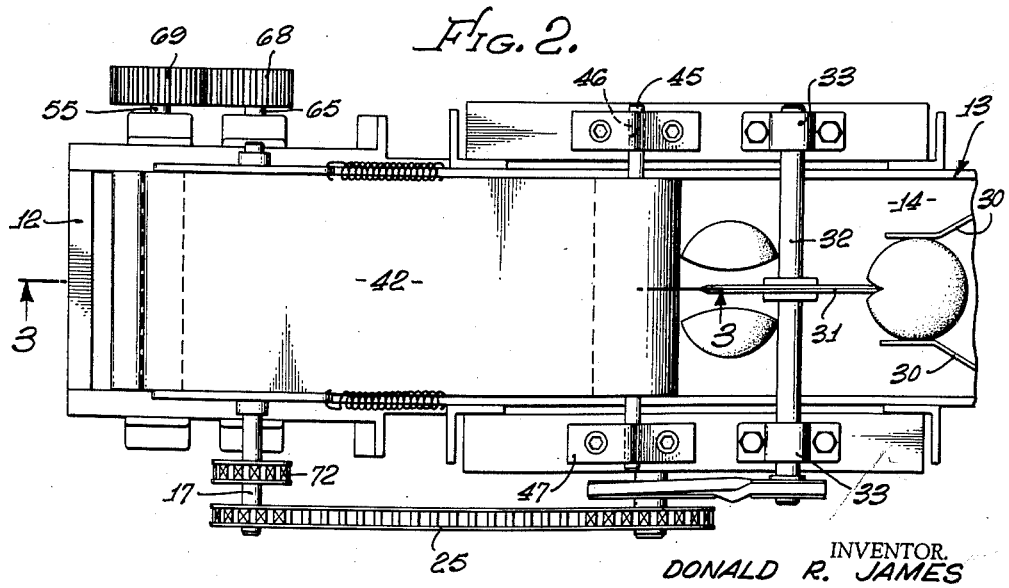
INVENTOR.
DONALD R. JAMES
BY Lyon & Lyon
ATTORNEYS.

Jan. 8, 1963 D. R. JAMES 3,072,161
CITRUS PEEL SLICER
Filed March 13, 1959 2 Sheets-Sheet 2
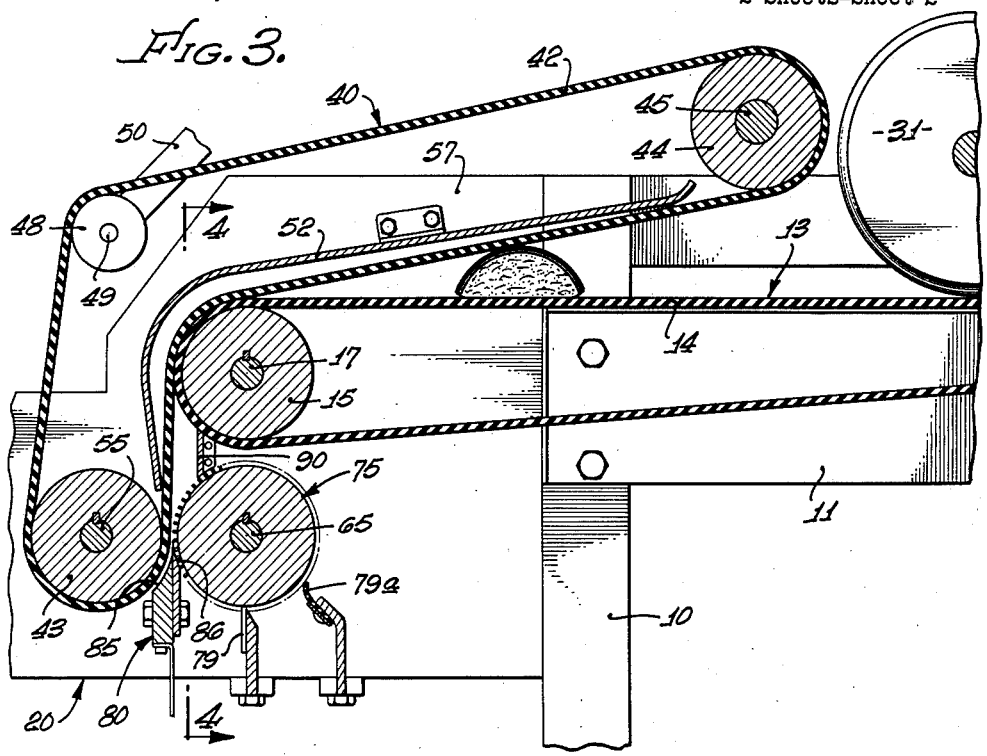
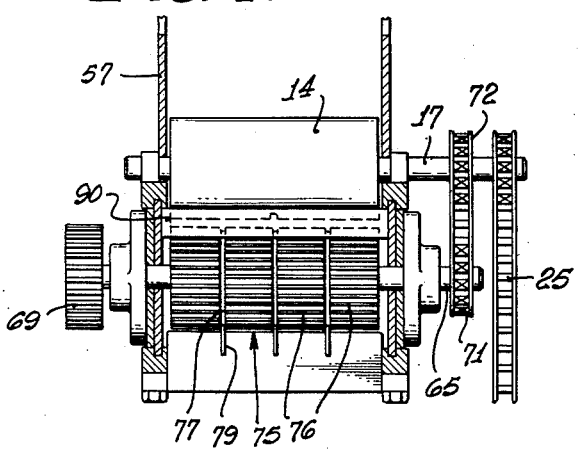
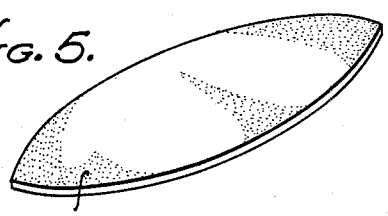
INVENTOR.
DONALD R. JAMES
BY
ATTORNEYS.

United States Patent Office 3,072,161
Patented Jan. 8, 1963

3,072,161
CITRUS PEEL SLICER
Donald R. James, West Covina, Calif., assignor to Citrus Equipment Corporation, Whittier, Calif., a corporation of California
Filed Mar. 13, 1959, Ser. No. 799,318
4 Claims. (Cl. 146—3)

This invention relates to the processing of citrus fruit and has particular reference to an apparatus for slicing the peel of citrus fruit.

One of the principal objects of the present invention is to provide a novel apparatus for slicing the skin or peel of citrus fruit to separate the flavedo and albedo layers thereof, or to separate the rag from the remainder of the skin, leaving the flavedo and albedo layers intact.

Citrus peel oil is an exteremely valuable commodity and many attempts have heretofore been made to produce a machine capable of automatically extracting the peel oil from the fruit. However, while certain of these attempts have been commercially successful from the standpoint of recovery of a satisfactory product, they are all subject to drawbacks such as low yields, high costs and relatively low speeds of operation. An important object of this invention is to provide a novel means for the removal of the oil-bearing flavedo layer from the skin of citrus fruits, which layer in turn can be easily operated upon to separate the oil therefrom.

Still another object of the present invention is to provide an apparatus fo slicing citrus peels to produce isolated layers thereof at high speeds and with a minimum of loss of the valuable oils contained therein.

Another object of the present invention is to provide an automatic machine designed to remove the rag from citrus peel, producing a high quality product suitable for the glacé fruit industry.

Other objects and advantages of the present invention it is believed will be readily apparent from the following detailed description of a preferred embodiment thereof, when read in connection with the accompanying drawings:

In the drawings:

FIGURE 1 is a side elevation of the apparatus of the present invention.

FIGURE 2 is an enlarged top plan view of the apparatus.

FIGURE 3 is a further enlarged sectional elevation taken substantially on the line 3—3 of FIGURE 2.

FIGURE 4 is a reduced scale sectional view taken substantially on the line 4—4 of FIGURE 3.

FIGURE 5 is a perspective view illustrating a typical flavedo layer as separated by the apparatus.

FIGURE 6 is a perspective view illustrating a typical albedo layer as separated by the apparatus.

Referring now to the drawings, the apparatus of the present invention includes a framework including a plurality of vertical legs 10, horizontal longitudinal frame members 11 and transverse frame members 12.

Mounted on the framework is a horizontal conveyor 13 comprising an endless belt 14 extending between a driven pulley 15 and an idler pulley 16. The pulley 15 is keyed to a shaft 17 journalled in suitable bearing members on an auxiliary framework 20. The pulley 16 is keyed to a shaft 21 journalled in suitable bearing members on the main framework. The shaft 17 carries at its outer end a sprocket 24, an endless chain 25 extending between this sprocket and a sprocket 26 on the drive shaft 27 of a motor 29.

Means are provided for halving citrus peel halves as they are moved along the conveyor 13, to produce peel quarters and, as shown in the drawings, these means may include a pair of spring guide members 30 which center the peel halves and direct them into engagement with a rotary knife 31. The members 30 are each secured at one end to one of a pair of upstanding brackets (not shown) on the framework and are bent inwardly as shown in FIGURE 2 to engage and resiliently center the fruit peel halves as they pass into contact with the knife 31. The knife is keyed to a shaft 32 journalled in bearings 33. The lower edge of the knife just clears the upper surface of the belt 14 as shown in FIGURE 1. If desired, two or more knives could be used to simultaneously handle two or more rows of incoming peel halves.

Mounted at an angle to the horizontal is a second conveyor 40 which, like the conveyor 13, is made up of an endless belt 42. The belt extends between pulleys 43 and 44, the pulley 44 being carried by a shaft 45 which is journalled in suitable bearings 46 secured to upstanding bracket members 47. The conveyor 40 is generally L-shaped, the lower run of the belt 42 extending around the pulley 15. The upper run of the belt 42 extends around an idler pulley 48 mounted on a shaft 49 carried on one end of an arm 50 which is pivoted to a bracket 51. The other end of the arm 50 is connected to one end of a spring 53, the other end of the spring being connected to the machine framework, to bias the pulley 48 upwardly and to the rear.

A generally L-shaped back-up plate 52 extends between the sides of the auxiliary framework, normally slightly spaced above the lower run of the belt 42.

The pulley 43 is carried by a shaft 55 journalled in suitable bearings mounted for adjustment in fore and aft directions on the auxiliary framework 20. A shaft 65 is journalled in suitable bearings secured to the auxiliary framework. The shaft 65 carries at one end a gear 68 engaged with a gear 69 carried on the shaft 55. The shaft 65 carries at its other end a sprocket 70. A chain 71 extends between this sprocket and a sprocket 72 on the shaft 17 for driving the shaft 65 and, in turn, the shaft 55.

Keyed to the shaft 65 is a roller or drum 75, the cylindrical surface of the drum being provided with a plurality of circumferentially spaced ribs 76 preferably axially aligned as shown. A number of sets of ribs are provided, adjacent sets being spaced apart to provide a plurality of circumferential grooves 77. A spring steel stripper finger 79 extends upwardly into each groove, the lower ends of the fingers being interconnected and secured to a lower transverse frame member 12. A rubber wiper blade 79a is also provided in contact with the drum 75.

Adjustably mounted below the bite between the drum 75 and the lower run of the conveyor 40 is a slicer knife 80. The knife extends between the side plates 57 of the auxiliary framework and is vertically adjustably secured thereto by suitable means such as bolts (not shown). The cutting edge of the knife is provided with arcuately honed surfaces 85 and 86, the surface 86 being closely spaced from the periphery of the drum 75.

A peel guide member 90 extends between the drum 75 and lower portion of the conveyor 13 which extends about the pulley 15.

In use of the apparatus of this invention, the citrus fruit, such as lemons or oranges, is cut into halves and the juice and pulp extracted therefrom in any convenient manner, such as in reamer type citrus juice extracting machines. A suitable juice extracting machine is disclosed in United States Patent No. 2,199,376, issued to William D. Brown. The fruit peel halves are then all oriented, by a suitable orienter such as that shown in United States Patent No. 2,799,218, to Harry A. Leslie et al., so that the cut faces thereof are down, and delivered one-by-one to the ramp 100 down which they slide onto the conveyor 13. An alternate procedure, which does not require the use of an orienter, is to utilize as the ramp 100 the discharge ramp, or an extension thereof, of the machine disclosed in United States Patent No. 2,853,107 to B. Alexander et al. In this manner, the peel halves slide directly from the juice extracting machine to the conveyor 13.

The peel halves move into contact with the guide members 30 which align the halves centrally of the conveyor and direct them into engagement with the rotary knife 31, whereupon the halves are quartered as indicated by the phantom lines of FIGURE 2. Immediately after the cutting of the peels, the peel quarters or segents are flattened between the belts 14 and 42, the belt 42 being moved upwardly against the back-up plate 52 and the flattened peel being conveyed around the pulley 16 by the frictional engagement of the belts 42. The peel then passes vertically downwardly where it is picked up by the drum 75 and conveyed thereby and by the belt 42 through the space between the drum and belts. The ribs 76 embed themselves in the relatively soft underside of the peel albedo layer 102 and positively feed the flattened peel into engagement with the knife 80 which cleanly separates the peel along a plane parallel to the upper and lower surfaces thereof. Depending upon the adjustment of the pulley 43, the peel is separated into the flavedo layer 103 and albedo layer 102, as indicated in FIGURE 6, or the flavedo and albedo layers are left intact, being separated as such from the rag portion of the peel. In the first case, the flavedo layer, which contains the valuable peel oil is then subjected to any suitable pressing or other operation to extract the oil therefrom. In the second case, the rag-free peel is ready for delivery to the processors of glacé fruit.

Having fully described my invention, it is to be understood that I do not wish to be limited to the details set forth, but my invention is of the full scope of the appended claims.

I claim:

1. In apparatus for slicing citrus peel, the combination of a first endless conveyor having an upper run extending in a substantially horizontal plane, a second endless conveyor having a lower run, a portion of said lower run extending at an angle to the upper run of said first conveyor, said lower run being closely spaced from the discharge end of said upper run, a vertical peel quartering knife positioned immediately above the upper run of said first conveyor and adjacent to the leading portion of the second conveyor, a rotating drum mounted adjacent the discharge end of the lower run of said second conveyor for passage of citrus peel therebetween, and a stationary knife blade interposed between said drum and said lower run.

2. The apparatus of claim 1 wherein said drum is provided with a plurality of axially aligned, spaced ribs on the periphery thereof, the periphery of said drum also being provided with a plurality of spaced, circumferential grooves, the apparatus also including a plurality of resilient fingers secured at only one end to said apparatus, the free ends of said fingers extending into said grooves.

3. The apparatus of claim 1 wherein said drum is provided with a plurality of spaced, axially aligned ribs on the periphery thereof.

4. The apparatus of claim 1 wherein said second conveyor is generally L-shaped with a portion of said lower run extending in a vertical direction.

References Cited in the file of this patent

UNITED STATES PATENTS

| | | |
|---|---|---|
| 866,354 | Gill | Sept. 17, 1907 |
| 1,138,143 | Olsen | May 4, 1915 |
| 1,486,918 | Plummer | Mar. 18, 1924 |
| 1,985,323 | McCall | Dec. 25, 1934 |
| 2,184,567 | Rundell | Dec. 26, 1939 |
| 2,212,066 | Fry | Aug. 20, 1940 |
| 2,477,289 | De Moss | July 26, 1949 |
| 2,515,748 | Wallace et al. | July 18, 1950 |

FOREIGN PATENTS

| | | |
|---|---|---|
| 318,043 | Great Britain | Aug. 29, 1929 |
| 687,585 | Germany | Feb. 1, 1940 |